April 24, 1956  E. C. REDETZKE  2,742,843
ADJUSTABLY MOUNTED SHOVELS FOR CULTIVATORS
Original Filed Sept. 9, 1946  2 Sheets-Sheet 1
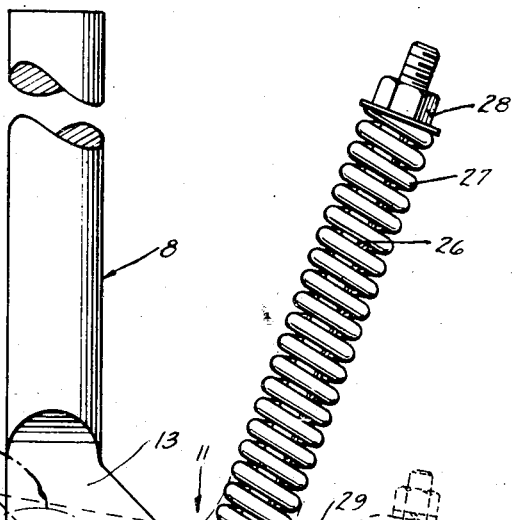
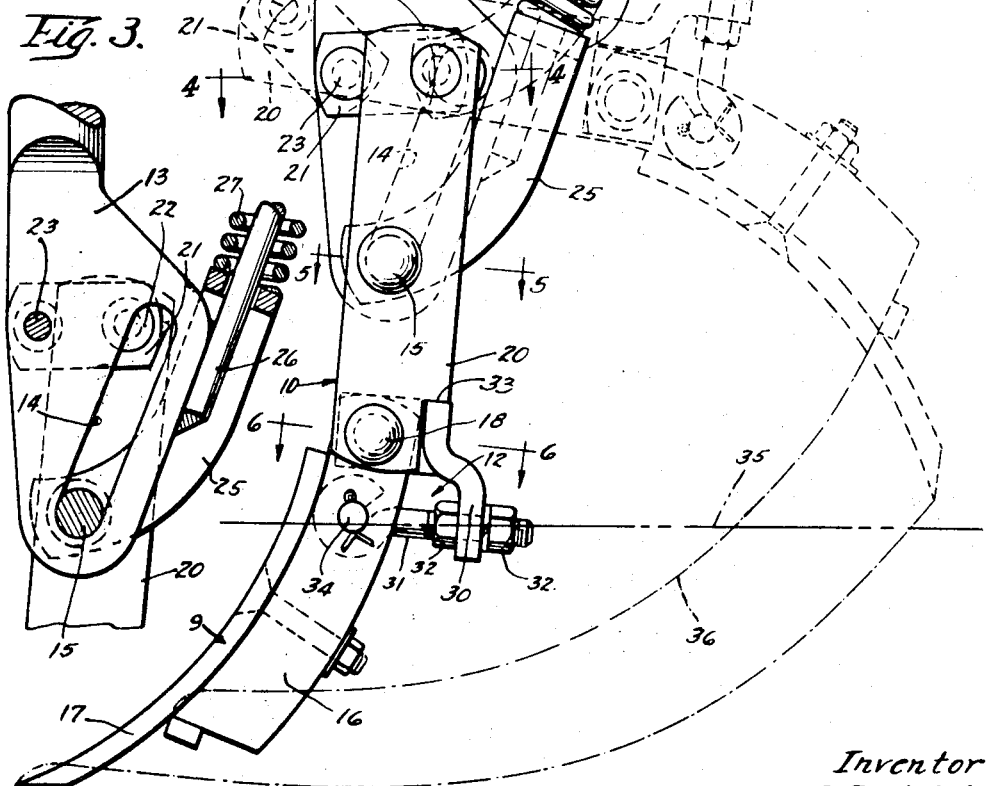
Inventor:
Emery C. Redetzke,
By Evans, Blaister & Anderson
Attorneys April 24, 1956        E. C. REDETZKE        2,742,843
ADJUSTABLY MOUNTED SHOVELS FOR CULTIVATORS
Original Filed Sept. 9, 1946        2 Sheets-Sheet 2
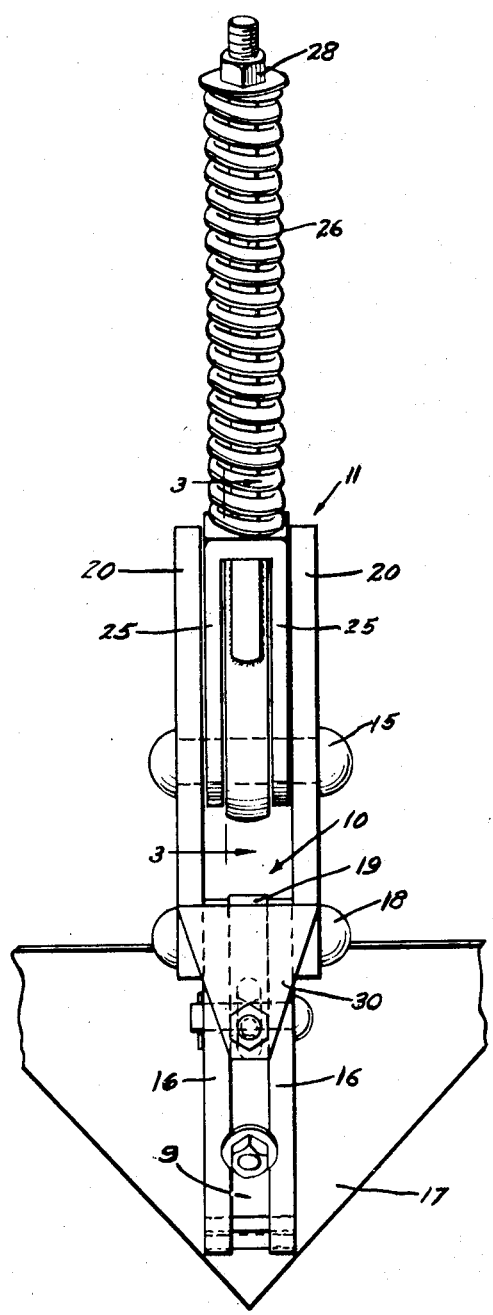
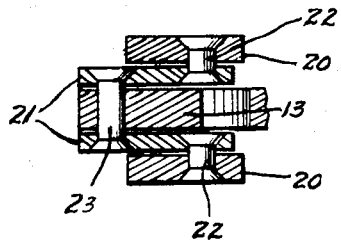
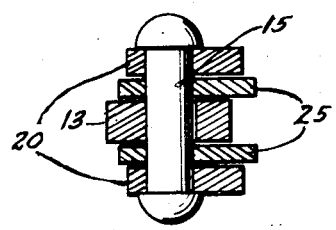
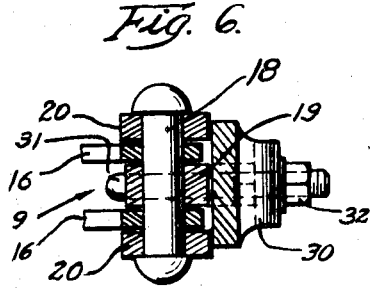
Inventor
Emery C. Redetzke,
By Svans, Glaister & Anderson,
Attorneys

United States Patent Office 2,742,843
Patented Apr. 24, 1956

2,742,843

ADJUSTABLY MOUNTED SHOVELS FOR CULTIVATORS

Emery C. Redetzke, Rock Island, Ill., assignor to J. I. Case Company, Racine, Wis., a corporation of Wisconsin Original application September 9, 1946, Serial No. 695,764, now Patent No. 2,634,665, dated April 14, 1953. Divided and this application August 18, 1952, Serial No. 304,864

3 Claims. (Cl. 97—198)

This invention relates to a spring-controlled shovel mount for cultivators.

In the cultivation of soil it frequently happens that obstructions are encountered by the shovels or steels. Injury of a shovel or steel is likely to result unless it is retracted as the cultivator continues its forward movement.

The main objects of this invention, therefore, are to provide an improved spring-controlled mounting for cultivator shovels which permits the retraction of a shovel upon its engagement with an obstruction likely otherwise to cause injury to the shovel; to provide an improved mounting of this kind which promptly returns the shovel to its operating position once the obstruction has been passed; to provide an improved construction of this kind which permits the principal parts to be made of welded stampings; and to provide an improved shovel mounting of this kind which is very simple in construction, which can be attached to any cultivator frame, and which is positive in operation.

Another object of the invention is to provide a simplified adjusting means between the shovel-carrying portion and the support portions in an apparatus of the type described.

A preferred embodiment of this invention is shown in the accompanying drawings in which:

Fig. 1 is a side elevation of this improved spring-controlled shovel-mount, showing in full line the shovel in its normal operative position below the ground level, and in dotted outline the position to which it is retractable by an obstruction extending to the ground level;

Fig. 2 is a rear elevation of this improved spring-controlled shovel-mount in its normal, operative position;

Fig. 3 is a fragmentary detail taken on the line 3—3 of Fig. 2;

Fig. 4 is a transverse sectional detail taken on the line 4—4 of Fig. 1;

Fig. 5 is a similar view taken on the line 5—5 of the Fig. 1; and

Fig. 6 is a similar view taken on the line 6—6 of Fig. 1.

The embodiment of the invention illustrated in the drawings comprises a supporting post or staff 8, a cultivator shovel 9, and means 10 for supporting the shovel on the staff 8. The shovel is yieldingly held in its normal operating position by means of a stabilizer or trip mechanism 11, and the shovel is retractable from this position if and when it strikes an obstruction that might cause injury thereto, or to the cultivator. The angularity of the shovel 9 relative to the staff 8 and the shovel-supporting means 10 is determined by an adjustment means 12.

The supporting post or staff 8 is of cylindrical form and is adapted to be attached to a cultivator frame. The lower end of the post is flattened to provide a shank 13 and a slot 14 is provided in the shank. The slot 14, as will be apparent from Figs. 1 and 3, is disposed at a slight angle to the axis of the supporting post 8 and is adapted to receive a pin 15 which constitutes a part of the shovel supporting means 10.

The shovel 9 comprises a pair of generally parallel, forwardly curving bars 16 connected together at their lower ends and carrying a suitable tool 17, the bars 16 being pivoted at their upper ends to the shovel-supporting means 10 by means of a pin 18. A spacer 19 holds the upper ends of the bars 16 in spaced apart, parallel relationship.

The shovel-supporting means 10 includes a pair of elongated, spaced apart, generally parallel, shovel supporting link members or plates 20 which are connected together intermediate the ends thereof by the pin 15 which engages the slot 14 in the shank 13. The lower ends of the shovel supporting link members 20 are connected to the shovel 9 by means permitting relative adjustment of the shovel, as will hereinafter be described. The upper ends of the shovel supporting link members are connected to the shank 13 by a pair of short, generally parallel links 21. The links 20 and 21 and the pin connection 15 co-act to permit the shovel 9 to swing rearwardly and upwardly upon its striking an obstruction.

One end of each of the links 21 is pivoted to the upper end of one of the shovel supporting members 20 by means of a pivot pin 22 and the other end of each of the links 21 is pivoted to the flattened shank 13 of the staff 8 by a pivot pin 23. The pins 22 are connected to the upper ends of the shovel supporting members 20 adjacent the rear edge thereof, whereas the pin 23 is connected to the shank 13 adjacent the forward edge thereof. The spacing and relative positioning of the pivot pins 22 and 23 and the pin 15 ensure the freedom of movement of the pin 15 in the slot 14 and are of importance in accomplishing the invention.

The initial thrust of the shovel 9, resulting from contact with an obstruction, is horizontal and is usually approximately perpendicular or normal to the axis of the post 8. The immediate result is a tendency for the shovel 9 and supporting plates 20 to revolve about the axis of the pin 15. The upper ends of the shovel supporting plates 20 tend to swing forwardly and produce a horizontal thrust against the pivot pins 22 and 23 of the links 21 more or less perpendicular to the axis of the post 8.

It is desired that this initial thrust of an obstruction against the shovel 9 shall effect instantly a vertical movement of the shovel 9 and the shovel supporting members 20, so that the shovel 9 may swing upwardly to pass over the obstruction. Such a vertical movement requires that the links 21 be started on a movement about the axis of the pivot pin 23 as a result of the horizontal thrust transmitted through the shovel supporting members 20 as represented by the arc 24 (see Fig. 1). To make that movement possible the axis of the pivotal connection 22 between the shovel supporting members 20 and the linkage 21 connecting those members to the shank 13 is located to one side of a plane which contains the axis of the pin 15 and the axis of the pivotal connection 23 between the linkage 21 and the shank 13, when the pin 15 is in the bottom of the slot 14. This arrangement will avoid the possibility of the links 21 locking as might be the case if the axes of the pivot pins 22 were located in the plane of the pivots 15 and 23. It will also be noted that the line of action of the links 21, i. e., the line connecting the axes of the pivots 22 and 23 intersects the line of action of the link members 20, i. e., a line connecting the axis of the pin 15 and the axis of the pivot 22, at an acute angle when the shovel support means is in its normal operating position. Further, this acute angle will decrease in magnitude as the shovel support means is moved rearwardly by the obstruction, with the end result that the shovel will tend, in effect, to jump upwardly and backwardly at a rapid rate in the event an obstruction is encountered. The acute angle relationship of the line of action of the links 21 and the line of action of the shovel supporting links 20 and the cooperative relationship of these links with the pin and slot connection between the post and the shovel supporting means assures positive and reliable operation of the device at all times.

The stabilizer or spring-trip means 11 includes a yoke 25 connected at its lower open ends to the shovel supporting members 20 by the pin 15. The yoke 25 is slidably mounted at its closed upper end on a rod 26 which is affixed at its lower end to the shank portion 13 of the staff 8, and is adapted to be biased downwardly by a spring 27, interposed between the yoke 25 and a nut 28 adjustably supported on the rod 26. The base 29 of the yoke 25 embraces the rod 26 above the latter's connection to the shank 13. The rod 26 is preferably welded to the shank 13 so as to extend upwardly and rearwardly with the axis of the rod parallel to the longitudinal dimension of the slot 14. As will be apparent from Fig. 1, the pressure exerted by the compression spring 27 on the yoke 25 may be adjusted by suitable movement of the nut 28.

The adjustment means 12, for determining the angularity of the shovel 9 with regard to the shovel supporting means 10, comprises a web 30 and a rod or eyebolt 31 adjustably connected together by nuts 32. The web 30 is welded to the shovel supporting members 20, and its upper end is adapted preferably, but not necessarily, to abut against shoulders 33 provided on the shovel supporting-plates 20 adjacent the pin 18. The inner end of the rod 31 is curved or looped so as to pivotally engage a pin 34 which extends between the bars 16. It will also be noted from Fig. 1 that the peripheral edge of the loop portion of the eye-bolt 31 is disposed in tangential engagement with the rear of the cultivator tool 17. This particular construction avoids a transferring of all of the shock forces imposed on the tool 17 to the pivot pin 34, which forces might otherwise shear the latter pin. It is seen, therefore, that the pin 34 and the web member 30 coact to initially absorb any direct shock effect on the tool 17 which may be transmitted to the adjusting means 12. Of course, shock forces of sufficient magnitude on the shovel 17 will also result in operation of the spring trip means 11.

During normal operation of the device the stabilizing means 11 will hold the shovel 9 in the soil below the surface, represented by the line 35 in Fig. 1. If the shovel 9 strikes an obstruction as it moves through the soil, forward movement of the shovel will stop, and continuing movement of the cultivator forward will cause the shovel 9 to swing upwardly and rearwardly, as the cultivator continues to move forward, so as to clear the obstruction. This, in effect, produces relative movement between the shovel 9 and supporting post 8 from the operative position shown in full lines in Fig. 1 to a retracted position shown in dotted lines in the same figure. The amount of relative movement or effective rearward and upward swing of the shovel 9 will, of course, depend upon how near to the surface of the ground the obstruction protrudes and upon the size of the obstruction.

Once the obstruction has been cleared the spring 27 will exert a strong force tending to restore the shovel 9 automatically to its normal operative position, and under favorable soil conditions, automatic resetting of the shovels will be effected without any further action by the operator. Under unfavorable conditions, the operator may find it necessary to raise the cultivator rigs, but this is the only operation needed to reset the shovels following operation of the shovel mount. This is a very important feature of the invention, because in the prior structures it is usually necessary to back the tractor with the cultivator rigs in the ground in order to reset the supports. Such a procedure is time consuming and not nearly so satisfactory as the substantially automatic resetting made possible by the shovel support of the present invention.

Variations and modifications in the details of structure and arrangement of the parts may be resorted to within the spirit and coverage of the appended claims.

This application is a division of my copending application Serial No. 695,764 filed September 9, 1946, issued as U. S. Patent No. 2,634,665, April 14, 1953, and entitled "Spring-Controlled Shovel Mount for Cultivators."

I claim:

1. In an agricultural implement, a shovel support means, a pair of spaced bars pivotally connected at their upper ends to the lower end of said shovel support means in longitudinally extending relation thereto, a shovel detachably secured to said bars, a web member secured to the lower end of said shovel support means and depending therefrom to a position below the pivotal connection between said shovel support means and said bars, adjustable means connecting the lower end of said web member with said spaced bars, said adjustable means comprising a pin extending between said spaced bars in generally parallel relation to and below the axis of said pivotal connection between said bars and said shovel support means, a generally horizontally extending rod connected at one end to said pin for vertical swinging movement, and means securing the other end of said rod to said web member in axially adjustable relation thereto.

2. In an agricultural implement, an elongated shovel support means, a pair of bars fixedly disposed in spaced parallel relation to each other, means pivotally connecting said bars with said shovel support means in longitudinally extending relation thereto, a shovel detachably secured along a forward edge of said parallel bars, a web member fixed to said shovel support means in rearwardly adjacent relation to the pivotal connection between said shovel support means and said bars, said web member being disposed in extending relation to said shovel support means and terminating at a position spaced from the rearward edge of said parallel bars and below said pivotal connection between the latter and said shovel support means, and adjustable means for fixedly positioning said parallel bars about the axis of said pivotal connection between said bars and said shovel support means, said adjustable means comprising a generally horizontally extending eye-bolt, a pin extending between said parallel bars and through the loop of said eye-bolt at a position below and in parallel relation to the axis of said pivotal connection between said bars and said shovel support means, and means adjustably securing the free end of said eye-bolt to said web member in axially fixed relation thereto.

3. In an agricultural implement, a shovel support means, a pair of spaced bars pivotally connected at their upper ends to the lower end of said shovel support means in longitudinally extending relation thereto, a shovel detachably secured in position along the forward edge of said bars, a web member secured to the lower end of said shovel support means and depending therefrom to a position below the pivotal connection between said shovel support means and said bars, and an adjustable means for selectively, fixedly positioning said bars about the axis of said pivotal connection, said adjustable means comprising a generally horizontally extending eye-bolt having at one end a looped portion abutting said shovel at a position below said pivotal connection between said bars and said shovel support means, a pin extending between said spaced bars and through the looped portion of said eye-bolt, and means adjustably securing the other end of said eye-bolt to said web member in axially fixed relation thereto.

References Cited in the file of this patent

UNITED STATES PATENTS

| | | |
|---|---|---|
| 371,995 | Timms | Oct. 25, 1887 |
| 865,651 | Traphagen | July 5, 1932 |
| 2,142,455 | Needham | Jan. 3, 1939 |
| 2,395,342 | Morkoski | Feb. 19, 1946 |
| 2,634,665 | Redetzke | Apr. 14, 1953 |

FOREIGN PATENTS

| | | |
|---|---|---|
| 583,680 | France | Nov. 4, 1924 |